UNITED STATES PATENT OFFICE.

ABRAHAM J. BAEWSKIN, OF CHICAGO, ILLINOIS.

COMPOSITION.

1,396,495.   Specification of Letters Patent.   Patented Nov. 8, 1921.

No Drawing.   Application filed April 28, 1919.   Serial No. 293,322.

*To all whom it may concern:*

Be it known that I, ABRAHAM J. BAEWSKIN, a citizen of the United States, and a resident of the city of Chicago, county of Cook, and State of Illinois, have invented a certain new and useful Composition, of which the following is a specification.

The object of my invention is the production of a welding preparation to be applied to the portions of gold or silver which are to be welded, thereby amalgamating said portions.

My composition consists of a mixture of mercury and nitric acid, boracic acid, niter and jet black ink. The jet black ink is used for the purpose of giving the composition the color most desired where this composition is designed to be used.

In preparing the composition, I prefer to use the ingredients in about the following proportions, viz:—Solution of mercury in nitric acid, one part; three per cent. solution of boracic acid, three parts; two per cent. solution of niter, three parts; jet black ink, one-fourth part. These ingredients are thoroughly mixed and the composition is then ready for use. In using the composition, the material to be welded is either dipped in the composition itself, or a portion of it is applied in some other suitable manner to the parts of the metal which are to be welded together.

My composition is used to form an amalgam of the metals to be welded together and thereby facilitates fusion of these parts which are to be welded together, and brings about a more rapid and easy welding of the parts of these metals.

While I have described the preferred form of composition for carrying my invention into effect, this is capable of variation and modification without departing from the spirit of the invention. I, therefore, do not wish to be limited to the precise details of composition set forth, but desire to avail myself of such variations and modifications as come within the scope of the appended claims.

Having described my invention, what I claim as new and desire to secure by Letters Patent is:—

1. A preparation adapted to be applied to gold or silver portions which are to be welded, comprising a solution of mercury in nitric acid, mixed with boracic acid, niter and jet black ink, substantially as described.

2. A composition consisting of one part solution of mercury and nitric acid, three parts of three per cent. solution of boracic acid, three parts of two per cent. solution of niter, and one-quarter part jet black ink, substantially as described.

In testimony whereof I have signed my name to this specification in the presence of two subscribing witnesses.

ABRAHAM J. BAEWSKIN.

Witnesses:
 JOSHUA R. H. POTTS,
 HELEN F. LILLIS.